(No Model.)
E. N. ANDERSON.
AXLE NUT.
No. 531,245. Patented Dec. 18, 1894.
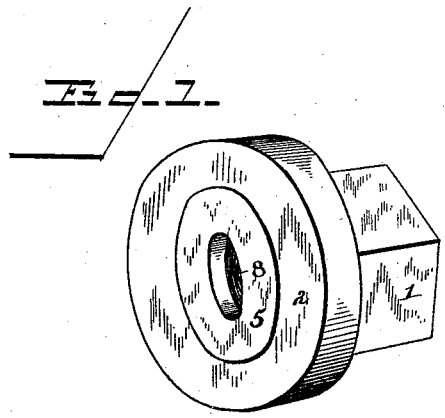
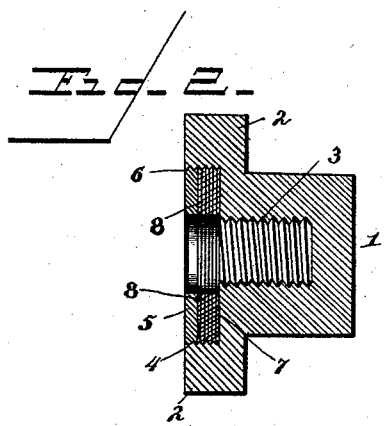
Witnesses
F. W. Wieser.
J. H. H. Riley
Inventor
Edwin N. Anderson.
By his Attorneys,
C. A. Snow & Co.
THE NORRIS PETERS CO., PHOTO-LITHO., WASHINGTON, D. C.

UNITED STATES PATENT OFFICE.

EDWIN N. ANDERSON, OF LILLY DALE, NEW YORK.

AXLE-NUT.

SPECIFICATION forming part of Letters Patent No. 531,245, dated December 18, 1894.

Application filed April 19, 1894. Serial No. 508,195. (No model.)

*To all whom it may concern:*

Be it known that I, EDWIN N. ANDERSON, a citizen of the United States, residing at Lilly Dale, in the county of Chautauqua and State of New York, have invented a new and useful Axle-Nut, of which the following is a specification.

The invention relates to improvements in axle nuts.

The object of the present invention is to improve the construction of axle nuts and to provide a simple and inexpensive one by which wear and lost motion may be readily taken up to prevent vehicle wheels from wabbling, and to enable the same to rotate smoothly.

The invention consists in the construction and novel combination and arrangement of parts hereinafter described, illustrated in the accompanying drawings, and pointed out in the claim hereto appended.

In the drawings: Figure 1 is a perspective view of an axle nut constructed in accordance with this invention. Fig. 2 is a sectional view of the same, taken longitudinally of the opening thereof.

Similar numerals of reference indicate corresponding parts in both the figures of the drawings.

1 designates an axle nut, having the outer terminus of its opening closed, and provided at its inner end with an enlarged cylindrical portion 2. The outer portion of its cylindrical opening or bore is threaded, at 3, and is adapted to receive the threaded end of a spindle of an axle, and the inner portion of the opening or bore, adjacent to the enlarged portion 2 of the nut, is enlarged to form a recess, and this enlarged portion or recess 4, of the opening or bore of the nut, is interiorly threaded and is adapted to receive an exteriorly-threaded washer 5. The washer 5 is provided at its edge 6 with the screw-threads. It is adapted to bear against the shoulder at the inner terminus of the threaded portion of a spindle; and interposed between the inner face of the washer and the annular shoulder 7 of the nut is a packing 8, consisting of a series of layers of paper, or similar material, whereby, as the axle becomes worn, or the face of the nut engaged by a wheel, layers of the packing may be removed to permit the nut to be screwed farther on the threaded portion of the spindle to take up such wear and prevent lost motion.

When an axle or the nut has become worn, the washer 5 may be readily unscrewed and removed from the enlarged portion of the nut, and as many of the layers as may be found necessary may be removed. After this operation the washer is replaced and the nut, which has its outer portion rectangular or of other polygonal shape to form a wrench-seat, may be readily screwed on an axle, and the wear and lost motion will be taken up.

It will be seen that the nut is simple and comparatively inexpensive in construction, and that it is capable of enabling lost motion or wear to be readily taken up.

Changes in the form, proportion, and the minor details of construction may be resorted to without departing from the principle or sacrificing any of the advantages of this invention.

What I claim is—

The combination of a nut having a threaded longitudinal bore and provided at the inner end thereof with an interiorly threaded annular recess, an adjustable washer threaded at its periphery and arranged in the threaded recess and adapted to bear against the outer shoulder of a spindle, and a packing located in the recess between the shoulder formed by the same and the washer and composed of a series of layers, and supporting the adjustable washer and providing a solid bearing for the shoulder of the spindle, substantially as and for the purpose described.

In testimony that I claim the forgoing as my own I have hereto affixed my signature in the presence of two witnesses.

EDWIN N. ANDERSON.

Witnesses:
J. C. SHULTS,
E. W. SHULTS.